US008239569B2

(12) United States Patent
Mirtorabi et al.

(10) Patent No.: US 8,239,569 B2
(45) Date of Patent: Aug. 7, 2012

(54) OSPF OPTIMIZATION FOR HUB AND SPOKE ENVIRONMENT

(75) Inventors: Sina Mirtorabi, Santa Clara, CA (US); Abhay Roy, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 1013 days.

(21) Appl. No.: 11/381,110

(22) Filed: May 1, 2006

(65) Prior Publication Data

US 2007/0255812 A1 Nov. 1, 2007

(51) Int. Cl.
G06F 15/177 (2006.01)
G06F 15/173 (2006.01)
H04L 12/28 (2006.01)
(52) U.S. Cl. .................... 709/238; 709/220; 370/351
(58) Field of Classification Search .......... 709/220–222, 709/238–244; 370/351–355
See application file for complete search history.

(56) References Cited

U.S. PATENT DOCUMENTS

| | | | | |
|---|---|---|---|---|
| 5,519,704 A * | 5/1996 | Farinacci et al. | .......... | 370/85.13 |
| 6,144,661 A * | 11/2000 | Katsube et al. | ............ | 370/390 |
| 6,603,756 B1 * | 8/2003 | Tappan | ............ | 370/351 |
| 6,757,258 B1 | 6/2004 | Pillay-Esnault | | |
| 6,823,395 B1 * | 11/2004 | Adolfsson | ............ | 709/242 |
| 6,950,427 B1 * | 9/2005 | Zinin | ............ | 370/386 |
| 7,065,059 B1 * | 6/2006 | Zinin | ............ | 370/312 |
| 7,248,579 B1 * | 7/2007 | Friedman | ............ | 370/389 |
| 7,334,047 B1 * | 2/2008 | Pillay-Esnault | ............ | 709/242 |
| 7,391,730 B1 * | 6/2008 | Chandra et al. | ............ | 370/236 |
| 7,421,483 B1 * | 9/2008 | Kalra | ............ | 709/220 |
| 7,542,432 B2 * | 6/2009 | Rajsic | ............ | 370/254 |
| 7,639,680 B1 | 12/2009 | Roy et al. | | |
| 7,697,454 B2 * | 4/2010 | Smith | ............ | 370/254 |
| 7,707,306 B2 * | 4/2010 | Ueno et al. | ............ | 709/238 |
| 7,801,030 B1 | 9/2010 | Aggarwal et al. | | |
| 2005/0091482 A1 * | 4/2005 | Gray et al. | ............ | 713/151 |
| 2005/0265260 A1 * | 12/2005 | Zinin et al. | ............ | 370/255 |
| 2007/0008949 A1 * | 1/2007 | Balandin | ............ | 370/351 |
| 2007/0271451 A1 * | 11/2007 | Fluhrer | ............ | 713/150 |

OTHER PUBLICATIONS

Moy, J. "OSPF Version 2." [Retreived online on Jan. 13, 2009] Apr. 1998. [Retreived from the Internet] <URL: http://www.ietf.org/rfc/rfc2328.txt>.*
Coltun, R. "The OSPF Opaque LSA Option." {Retreived online on Jan. 13, 2009] Jul. 1998. {Retreived from the Internet] <URL: http://www.ietf.org/rfc/rfc2370.txt>.*
Cisco. "OSPF Routing Protocol." Published online on Oct. 11, 2001. Retrieved from the Internet on May 18, 2011. <URL: www.cisco.com/partner/sdm/ci/routing/ospf/CI_OSPF.html>.*

(Continued)

*Primary Examiner* — Joseph Avellino
*Assistant Examiner* — James Baron
(74) *Attorney, Agent, or Firm* — Cesari and McKenna, LLP

(57) ABSTRACT

A method and apparatus for routing data in a network is disclosed. A spoke router signals its intention to act as spoke in a new bit in Hello and database descriptor packets. A router acting as hub acknowledges the spoke request. Once the spoke router receives the hub's acknowledgement, it installs a default route to the hub router. Flooding is suppressed from hub to spoke. Instead of flooding, the hub router sends empty database descriptor packets so that no request is sent from spoke routers and any further change in the topology is not sent to spoke routers. This minimizes the flooding in this environment.

22 Claims, 2 Drawing Sheets

OTHER PUBLICATIONS

Networkers-Online.com. "The endless story of OSPF vs IS-IS PArt 3 Packets and Database." Published on May 16, 2010. Retrieved from the Internet on May 9, 2011. <URL: www.networkers-online.com>.*

Martey et al. "IS-IS Network Design." Copyright 2002 Cisco Press. Retrieved from the Internet on May 19, 2011. <URL: www.cisco.com> pp. 1-2, 178 and 218 (4 pages total.).*

"OSPF Routing Protocol," Cisco Systems, Inc., Oct. 11, 2001, pp. 1-48.

* cited by examiner

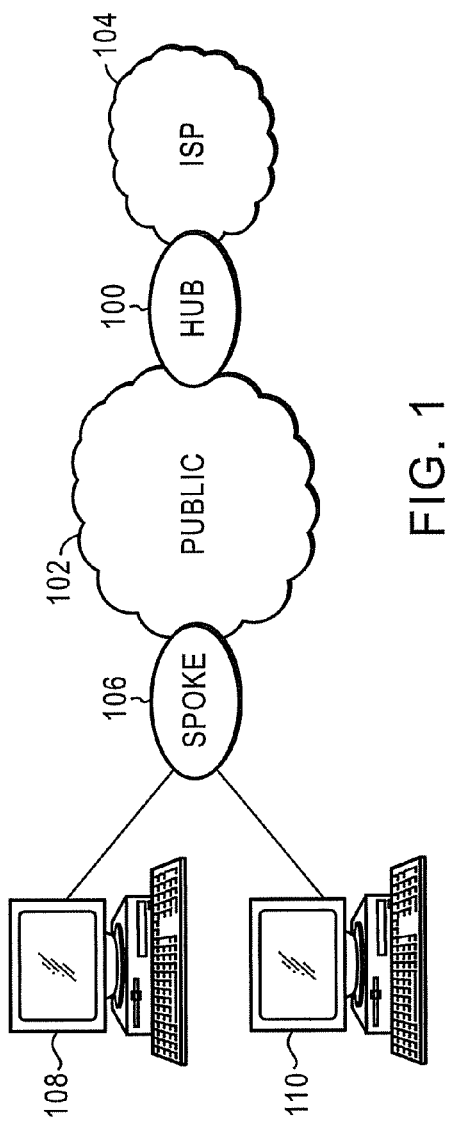
FIG. 1
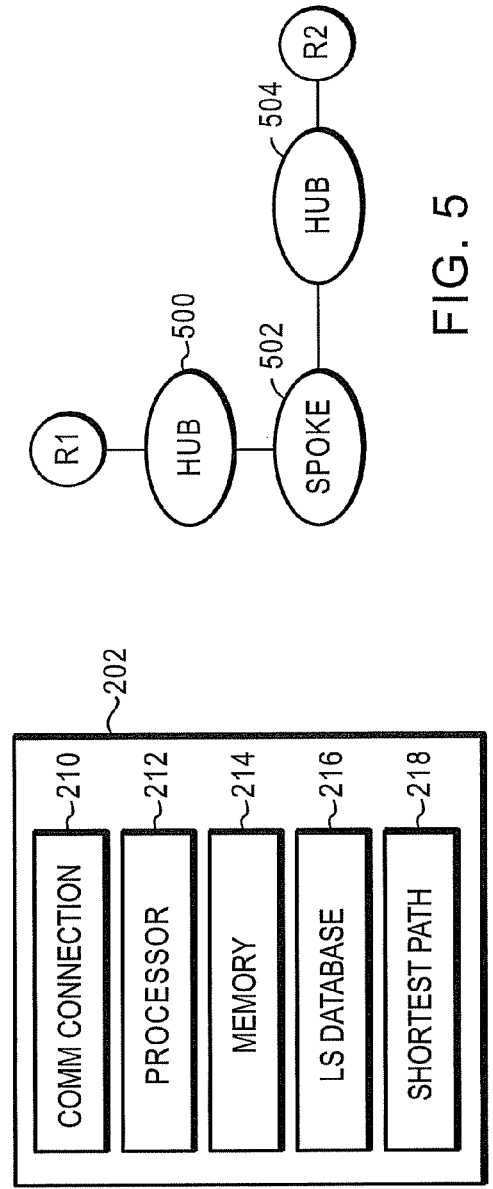
FIG. 5
FIG. 2

OSPF OPTIMIZATION FOR HUB AND SPOKE ENVIRONMENT

FIELD

The present invention relates broadly to packet-switched networks having a hub and spoke topology. Specifically, the present invention relates to a spoke router communicating a request to a hub router, receiving acknowledgement from the hub router, and setting a default path to the hub router.

BACKGROUND

Open Shortest Path First (OSPF) is a routing protocol developed for Internet Protocol (IP) networks. OSPF is a link-state routing protocol that calls for the sending of link-state advertisements (LSAs) to all other routers within the same hierarchical area. Information on attached interfaces, metrics used, and other variables, is included in OSPF LSAs. As OSPF routers accumulate link-state information, they use algorithms that calculate the shortest path to various routers (network nodes). A topological database is essentially an overall picture of networks in relationship to routers. The topological database contains the collection of LSAs received from all routers in the same area. Because routers within the same area share the same information, they have identical topological databases.

The Shortest Path First (SPF) routing algorithm is the basis for OSPF operations. When a router using the SPF algorithm is powered up, it initializes its routing-protocol data structures and then waits for indications from lower-layer protocols that its interfaces are functional. After a router is assured that its interfaces are functioning, it uses the OSPF Hello protocol to acquire neighbors, which are routers with interfaces to a common link. The router sends hello packets to its neighbors and receives their hello packets. In addition to helping acquire neighbors, hello packets also act as "keepalives," messages that let routers know that other routers are still functional. On multi-access networks (networks supporting more than two routers), the Hello protocol elects a designated router and a backup designated router. Among other things, the designated router is responsible for generating LSAs for the entire multi-access network. Designated routers allow a reduction in network traffic and in the size of the topological database.

When the topological databases of two neighboring routers are synchronized, the routers are said to be adjacent. Adjacencies control the distribution of routing-protocol packets, which are sent and received only on adjacencies. Each router periodically sends its LSAs to provide information on a router's adjacencies or to inform others when a router's state changes. By comparing established adjacencies to link states, failed routers can be detected quickly, and the network's topology can be altered appropriately. From the topological database generated from LSAs, each router calculates a shortest-path tree (SPT), with itself as root. The SPT, in turn, yields a routing table.

When two OSPF neighboring routers establish an adjacency, they go through a finite state machine (FSM). For each neighbor, the router maintains a separate, independent from the other neighbors, FSM. Each FSM goes through several states before establishing adjacency. The two normal long-term states are known to those skilled in the art as "2-way" and "Full." Depending on the role a router (and its neighbors) play on a particular network, it is expected that the router reach either 2-way or Full state with its neighbors. However, it should never maintain any other state with a neighbor for a prolonged period of time.

In OSPF, before two routers can announce an adjacency to each other and use their common link for forwarding data, they have to exchange their databases through database description (DD) packets to assure that their databases are synchronized. In situations where routers already have a synchronized database and establish a new adjacency over a link, they spend some time in exchanging their database even though their database might be already synchronized. This is a time-consuming process that also requires processing resources on two separate routers.

A hub and spoke topology is defined as a point-to-multipoint network topology where one or more routers, referred to herein as hub routers, are connected to sets of remote routers, referred to herein as spoke routers. In such a topology, a change in one of the spokes is propagated to all of the other spokes although this information is not necessary as the spoke's next hop remains unchanged with respect to the hub. This unnecessary flooding limits the scalability of hub and spoke design. Many enterprise networks have a hub and spoke topology requiring a large deployment of hub and spoke. For example, in a topology having 1000 spoke routers where a hub router typically has 10,000 link state advertisements (LSAs) in its database, it is necessary to make sure that all of those LSA are sent to all of the spoke routers. This consumes substantial CPU time and memory resources, and beyond a certain level either the CPUs are running high (often at 100% of their capacity) or the memory completely consumed, thus limiting the number of LSAs and spokes that can be accommodated in the topology.

BRIEF DESCRIPTION OF THE DRAWINGS

FIG. 1 illustrates in block diagram form a hub and spoke network topology in accordance with the present invention.

FIG. 2 illustrates in block diagram form the major components of a router embodying a hub router or a spoke router in accordance with the present invention.

FIG. 5 illustrates a routing path between routers in accordance with the present invention.

DETAILED DESCRIPTION

Figure 3:
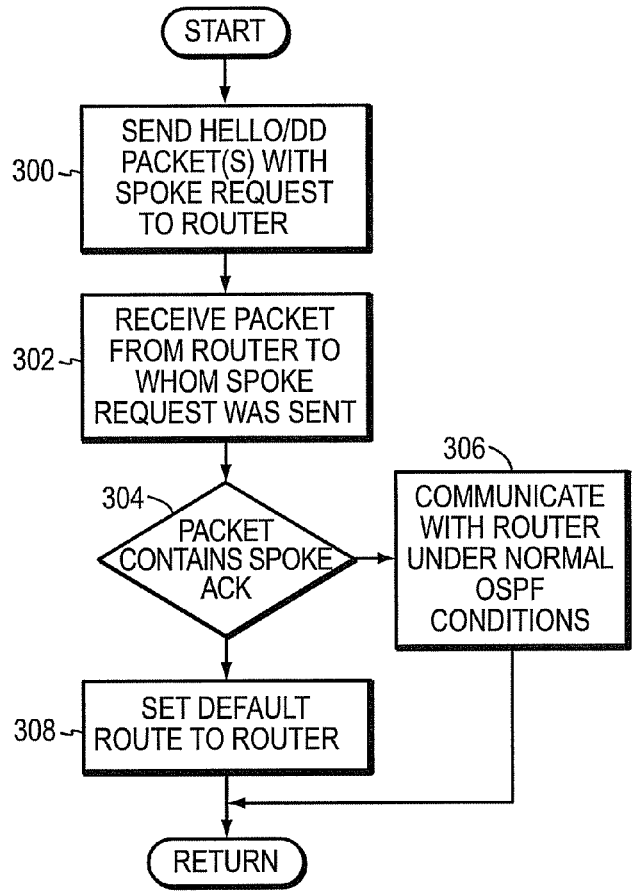
FIG. 3 illustrates a sequence of acts executed by a spoke router in accordance with the present invention.

The present invention allows OSPF to be realized in much larger hub and spoke router deployments. By drastically reducing the number of LSAs being sent to spokes, the effective runtime CPU/memory utilization is much lower, hence allowing for many more LSAs/spokes to be provisioned in the network than have been possible in previous topologies.

A spoke router signals its intention to act as spoke in a new bit in Hello and DD packet options referred to as spoke request (SR). A router acting as hub acknowledges the spoke request by setting the SA (spoke Ack) bit in its Hello and DD packets. Once the spoke router sees the hub's SA bit set, it installs a default route to the hub router.

Flooding is suppressed from hub to spoke. Instead of flooding, the hub router sends empty DD packet so that no request is sent from spoke routers and any further change in the topology is not sent to spoke routers. This minimizes the flooding in this environment.

The present invention also can be utilized in embodiments having Intermediate System-to-Intermediate System (IS-IS) topologies. IS-IS is a link-state routing protocol that behaves much like the Open Shortest Path First (OSPF) protocol. IS-IS was developed as part of the Open System Interconnection (OSI) stack of protocols and uses OSI protocols to deliver packets and establish adjacencies. IS-IS routers need to be assigned OSI addresses, which they use as router identifiers to create network structure. IS-IS has been adapted to carry IP network information, and this form is called Integrated IS-IS. Integrated IS-IS has the most important characteristic necessary in a modern routing protocol: It supports VLSM and converges rapidly. It is also scalable to support very large networks.

IS-IS floods a network with link-state information to build a complete, consistent picture of a network topology. To simplify router design and operation, IS-IS distinguishes between Level 1 and Level 2 ISs. Level 1 ISs communicate with other Level 1 ISs in the same area. Level 2 ISs route between Level 1 areas and form an intradomain routing backbone. Hierarchical routing simplifies backbone design because Level 1 ISs need to know only how to get to the nearest Level 2 IS. The backbone routing protocol can also change without impacting the intra-area routing protocol.

IS-IS uses three basic packet formats: IS-IS hello packets, link state packets (LSPs), and sequence number packets (SNPs). Each of the three IS-IS packet types has a complex format that includes an 8-byte fixed header, a packet type-specific portion having a fixed length, and a packet type-specific portion having a variable length. For hub and spoke topologies utilized in IS-IS systems, the present invention also can be realized by placing within the IS-IS hello packets the SR bit described above for packets sent by spoke routers and placing the SA bit described above in the hello packets sent by hub routers. This allows the invention described and illustrated as follows to be utilized in IS-IS systems having hub and spoke topologies.

Directing attention to FIG. 1, hub router 100 is disposed between public network 102 and Internet service provider (ISP) network 104. On the other side of public network 102 is spoke router 106, which is in communication with computers 108, 110. While FIG. 1 illustrates a single spoke router, it is to be understood that a spoke site may contain multiple routers behind spoke router 106. Similarly, while only two computers 108, 110 are illustrated, it is to be understood that other computers can also be connected to spoke router 106.

FIG. 2 illustrates the main components found in hub router 100 and spoke router 106.

Router 202 includes communication connection 210, processor 212, memory 214, link state database 216, and shortest path data structure 218. Other components, commonly found in routers known to those skilled in the art, are included in router 202, but are not illustrated.

Returning to FIG. 1, spoke router 106 announces its attached prefix in a link-local link state advertisement (LSA). This LSA is the only LSA flooded from spoke routers to hub routers. Hub router 100 uses this information to have reachability to a spoke site and further announce this information in its self-originated LSA as its attached prefix to other parts of the network.

Spoke router 106 sets the spoke request (SR) bit in its Hello packet in order to request a spoke behavior. Hub router 100 acknowledges the request by setting the spoke Ack (SA) bit. If no SA bit is received from hub router 100, spoke router 106 continues to set the SR bit in its Hello but follows the standard OSPF behavior. The setting of SR and SA indicates the capability of hub and spoke to support the optimization.

For OSPFv3, the SR and SA bit are defined in options field:

```
 0  1  2...0  1  2  3  4  5  6  7  8  9  0  1  2  3  4
+--+--+---+--+--+--+---+--+--+--+--+--+--+--+--+--+-+--+
|SR|SA|...|  |  |  |...|  |  |  | *| *|DC|R | N |MC|E |V6
+--+--+---+--+--+--+---+--+--+--+--+--+--+--+--+--+-+--+
```

For OSPFv2, the SR and SA bit are defined in LLS [LLS] EO-TLV that is carried in both Hello and DD packets:

```
+---+---+---+---+---+---+---+---+---+---+---+---+---+
| * | * | * | * | * |...| * | * | * | * |SA |SR |RS |LR |
+---+---+---+---+---+---+---+---+---+---+---+---+---+
```

With respect to spoke router operations (FIG. 3), spoke router 106 requests to serve as a spoke router in accordance with the present invention by setting the SR bit in its outbound Hello and DD packets in act 300. When spoke router 106 receives a Hello or DD packet (in ExStart Neighbor FSM) from hub router 100 (act 302), it determines whether or not the packet contains a spoke acknowledgement in the form of the SA-bit (stub ack) set (decision act 304). If no spoke acknowledgement is contained in the received packet, spoke router 106 communicates with hub router 100 under normal OSPF conditions at act 306. However, if the packet contains a spoke acknowledgement it installs a default route to hub router 100 (act 308). The usage of SA and SR bit in DD packet assures that the communication is reliable.

It is to be understood that during DD exchange with respect to act 300, spoke router 100 is ONLY sending its attached prefix through a link-local LSA. For OSPFv2 the prefixes are advertised through a new Opaque type 9 LSA.

Figure 4:
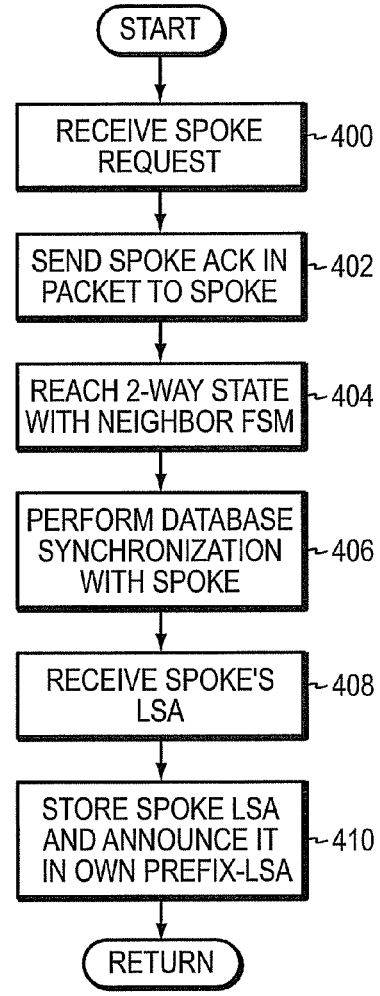
FIG. 4 illustrates a sequence of acts executed by a hub router in accordance with the present invention.

Directing attention to hub router operations shown in FIG. 4, when hub router 100 receives a spoke request (act 400), it sets the SA bit (spoke ack) in its Hello and DD packet (act 402). When SA bit is set and the neighbor FSM reach synchronization, such as the 2-way state (act 404), hub router 100 goes through DD exchange with spoke router 106 but sends empty DD packet so that no LSA is flooded to spokes (act 406). All flooding toward spokes 108, 110 is suppressed.

At act 408, hub router 100 receives spoke router 106's link-LSA. Hub router 100 installs in its link state database the prefix advertised in spoke's link-LSA (act 410) and announces it in its intra-area-prefix-1sa as if the prefixes are directly attached. For OSPFv2, prefixes are advertised as a stub link in hub router 100's router LSA. Hub router 100 does not advertise its adjacency with spoke routers, in its Router-LSA.

Advertising as a stub link in hub router 100's router LSA the prefix that was advertised in spoke router 106's link-LSA minimizes the number of LSAs and also avoids routing loops. Directing attention to FIG. 5, if a spoke's LSAs are flooded through the flooding domain and are part of SPT, router R1 can calculate a path to router R2 via the path [router R1, hub 500, spoke 502, hub 504, router R2]. However, the spoke has no topology information but only default to hub 500 and hub 504 therefore a routing loop may occur. Not flooding spoke router 106's LSAs and announcing its prefix as hub router 100's local prefix avoids the routing loop because spoke router 106 is never used as transit node.

For OSPFv3, the same link-LSA is used to advertise spoke router 106's prefix to hub router 100. The P bit in prefix option is used in order to control the re-advertisement of prefix by hub. By default the P bit is set and hub router 100 advertises the prefix in its intra-area-prefix-LSA. If the P bit is clear the prefix is not propagated further by hub router 100. For example, this mechanism can be used to limit the propagation of spoke router 106's prefix if hub router 100 already advertises a default route into the domain. The prefix may appear as follows:

```
 0  1  2  3  4  5  6  7  8
+--+--+--+--+--+--+--+--+--+
|  |  |  |DN| P|MC|LA|NU|
+--+--+--+--+--+--+--+--+--+
```

For implementations utilizing OSPFv2, the present invention defines a new type 9 opaque LSA. The unique ID is a unique distinguisher for generation multiple link-LSA. The body of the link-LSA is defined as follows:

default route (type 5) within the site. The generation of the default is conditional and is generated as long as spoke router 106 installs a default route toward hub router 100, i.e. spoke neighbor FSM is at least ExStart so that the SA bit is set by hub router 100.

With respect to SPF and route calculation, for spoke routers having only a hub router neighbor with SA bit set, no SPF is performed as no LSA is received from the hub router. A default route is installed as long as spoke neighbor FSM is at least Exstart. If the spoke has other non-hub neighbors (i.e. spoke site) then SPF is performed for non-hub neighbors.

For example, on hub router 100, SPF is performed for non-spoke neighbors. For spoke neighbors, the prefixes received through spoke's link LSA are treated as "stub" prefixes in the area. The reachability to the LSA is maintained via Hello, that is, if the neighbor is down, the LSA is marked unreachable, and if the neighbor comes back up, the LSA is marked reachable again.

Thus, the present invention optimizes OSPF operations in a hub and spoke environment by suppressing flooding between hub and spoke. The spoke floods an LSA advertising its site's prefix only over a local link. Further, options bits in Hello and DD packets are used for spoke requests and spoke acknowledgements. This allows the hub to automatically detect spoke capabilities and also is used for default route installation on spoke.

The present invention increases the scalability of hub and spoke topology by drastically reducing the flooding between hub and spoke. Moreover, the spoke's link state database (LSDB) becomes independent of the size of hub and spoke topology allowing a low-end platform to be used.

This present invention optimizes and scales to a great degree the use of OSPF in hub and spoke as well as IS-IS

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|          LS age              |    Options    |       9       |
+-+-+-+-+-+-+-+-+-+-+-+-+-+-+-+-+-+-+-+-+-+-+-+-+-+-+-+-+-+-+-+-+
| Opaque-type   |              Unique ID                       |
+-+-+-+-+-+-+-+-+-+-+-+-+-+-+-+-+-+-+-+-+-+-+-+-+-+-+-+-+-+-+-+-+
|                      Advertising Router                      |
+-+-+-+-+-+-+-+-+-+-+-+-+-+-+-+-+-+-+-+-+-+-+-+-+-+-+-+-+-+-+-+-+
|                      LS sequence number                      |
+-+-+-+-+-+-+-+-+-+-+-+-+-+-+-+-+-+-+-+-+-+-+-+-+-+-+-+-+-+-+-+-+
|       LS checksum             |            length            |
+-+-+-+-+-+-+-+-+-+-+-+-+-+-+-+-+-+-+-+-+-+-+-+-+-+-+-+-+-+-+-+-+
|                           # prefixes                         |
+-+-+-+-+-+-+-+-+-+-+-+-+-+-+-+-+-+-+-+-+-+-+-+-+-+-+-+-+-+-+-+-+
|  PrefixLength | PrefixOptions |              0               |
+-+-+-+-+-+-+-+-+-+-+-+-+-+-+-+-+-+-+-+-+-+-+-+-+-+-+-+-+-+-+-+-+
|                           IP Address                         |
+-+-+-+-+-+-+-+-+-+-+-+-+-+-+-+-+-+-+-+-+-+-+-+-+-+-+-+-+-+-+-+-+
|                             ...                              |
+-+-+-+-+-+-+-+-+-+-+-+-+-+-+-+-+-+-+-+-+-+-+-+-+-+-+-+-+-+-+-+-+
|  PrefixLength | PrefixOptions |              0               |
+-+-+-+-+-+-+-+-+-+-+-+-+-+-+-+-+-+-+-+-+-+-+-+-+-+-+-+-+-+-+-+-+
|                           IP Address                         |
+-+-+-+-+-+-+-+-+-+-+-+-+-+-+-+-+-+-+-+-+-+-+-+-+-+-+-+-+-+-+-+-+
```

The present invention is particularly useful for a site with one or more spoke routers and no internal routers. If a spoke site has other routers behind the spoke routers some additional mechanism is performed in order to propagate a default route within the site and announce the site's prefixes to hub router 100. In this case, spoke router 106 has to advertise all reachable prefix within the site in its link-LSA to hub router 100. Note that normal OSPF operations occur within the site, however, the spoke router does not flood any LSAs to hub router 100 except its Link-LSA in order to advertise the site's reachable prefix. Furthermore, spoke router 106 advertises a topologies using hub and spoke. Also, as re-sources are minimized on a spoke it is expected that any low-end platform can be used as a spoke independently of the number of spokes connected to a hub.

The present invention can be used for an enterprise having a large hub and spoke topology and seeking to scale OSPF in this environment, and is especially useful in embodiments that use low-end platforms for spoke routers independently of the size of the hub and spoke topology.

While the present invention has been described and illustrated in detail, it is to be understood that many changes and modifications can be made to various embodiments of the invention without departing from the spirit thereof.

What is claimed is:

1. A method comprising:
   setting, at a first router, a spoke request bit in a first packet, the spoke request bit indicating that the first router is available to serve a second router as a spoke router in a hub and spoke topology used by a link-state routing protocol;
   sending the first packet to the second router;
   sending from the second router a second packet containing an acknowledgement that the spoke request bit in the first packet was detected by the second router;
   installing on the first router a default route to the second router;
   forming a hub and spoke relationship with the second router, wherein the second router is a hub router of the hub and spoke topology used by the link-state routing protocol and the first router is a spoke router of the hub and spoke topology used by the link-state routing protocol; and
   based on the inclusion of the spoke request bit in the first packet, suppressing flooding of link state information from the second router that is the hub router to the first router that is the spoke router by sending empty database description packets from the second router that is the hub router to the first outer that is the spoke router.

2. The method of claim 1, wherein the first packet comprises a hello packet.

3. The method of claim 1, wherein the first packet comprises a database description packet.

4. The method of claim 1, wherein the acknowledgement comprises a bit, the bit set in the second packet.

5. The method of claim 1, wherein the link-state routing protocol is an Intermediate System-to-Intermediate System (IS-IS) routing protocol and the first router and the second router are located in separate systems in an IS-IS topology.

6. The method of claim 1, wherein the default route is used for transmission of data between the first router and the second router.

7. A system, comprising:
   a first router having a communication network connection, a memory, and a processor configured to:
      set a spoke request bit in a first packet stored in the memory, the spoke request bit indicating that the router is available to serve as a spoke router in a hub and spoke topology for a link-state routing protocol,
      send the first packet over the first router's communication network connection, and
      install in the first router's memory a default route to a hub router; and
   a second router operating as the hub router and having a communication network connection, a memory, and a processor configured to:
      send a second packet from the second router over the second router's communication network connection, the second packet containing an acknowledgement that the spoke request bit in the first packet was detected by the second router, and
      based on the inclusion of the spoke request bit in the first packet, suppress flooding of link state information from the second router to the first router by sending empty database description packets from the second router to the first router.

8. The method of claim 1, wherein the link-state routing protocol is an Open Shortest Path First (OSPF) routing protocol.

9. The system of claim 7, wherein the link-state routing protocol is an Intermediate System-to-Intermediate System (IS-IS) routing protocol.

10. The system of claim 7, wherein the link-state routing protocol is an Open Shortest Path First (OSPF) routing protocol.

11. A method comprising:
    receiving, at a second router that operates as a hub router in a hub and spoke topology, a first link-state routing protocol packet from a first router, the first link-state routing protocol packet including a spoke request indicating that the first router is requesting to serve as a spoke router in the hub and spoke topology;
    in response to the first link-state routing protocol packet, sending a second link-state routing protocol packet from the second router to the first router, the second link-state routing protocol packet including a spoke acknowledgement confirming that the first router is to operate as a spoke router in the hub and spoke topology;
    performing a database synchronization between the second router that operates as the hub router and the first router that operates as the spoke router; and
    based on the inclusion of the spoke request in the first link-state routing protocol packet, suppressing flooding of link state information from the second router that operates as the hub router to the first router that operates as the spoke router during the database synchronization by sending empty database description (DD) packets from the second router that operates as the hub router to the first router that operates as the spoke router.

12. The method of claim 11 wherein the spoke request included in the first link-state routing protocol packet is a set spoke request bit and the spoke acknowledgment included in the second link-state routing protocol packet is a set spoke acknowledgment bit.

13. The method of claim 11, wherein the first link-state routing protocol packet is a hello packet.

14. The method of claim 11, wherein the first link-state routing protocol packet is a DD packet.

15. The method of claim 11, wherein the link-state routing protocol is an Open Shortest Path First (OSPF) routing protocol and the link state information is link state advertisements (LSAs).

16. The method of claim 11, wherein the link-state routing protocol is an Intermediate System-to-Intermediate System (IS-IS) routing protocol.

17. An apparatus comprising:
    a communication network connection;
    a memory; and
    a processor, the processor configured to:
       process a first link-state routing protocol packet received via the communication network connection from a first router, the first link-state routing protocol packet to include a spoke request that indicates the first router requests to serve as a spoke router in a hub and spoke topology,
       in response to the first link-state routing protocol packet, send a second link-state routing protocol packet via the communication network connection to the first router, the second link-state routing protocol packet including a spoke acknowledgement confirming the first router is to operate as a spoke router in the hub and spoke topology,
       perform a database synchronization with the first router that operates as the spoke router, and
       based on the inclusion of the spoke request in the first link-state routing protocol packet, suppress flooding of link state information to the first router that operates as the spoke router during the database synchronization by transmission of empty database description (DD) packets to the first router that operates as the spoke router.

18. The apparatus of claim 17, wherein the spoke request included in the first link-state routing protocol packet is a set spoke request bit and the spoke acknowledgment included in the second link-state routing protocol packet is a set spoke acknowledgment bit.

19. The apparatus of claim 17, wherein the first link-state routing protocol packet is a hello packet.

20. The apparatus of claim 17, wherein the first link-state routing protocol packet is a DD packet.

21. The apparatus of claim 17, wherein the link-state routing protocol is an Open Shortest Path First (OSPF) routing protocol and the link state information is link state advertisements (LSAs).

22. The apparatus of claim 17, wherein the link-state routing protocol is an Intermediate System-to-Intermediate System (IS-IS) routing protocol.

* * * * *

UNITED STATES PATENT AND TRADEMARK OFFICE
CERTIFICATE OF CORRECTION

PATENT NO. : 8,239,569 B2  
APPLICATION NO. : 11/381110  
DATED : August 7, 2012  
INVENTOR(S) : Mirtorabi et al.

Page 1 of 1

It is certified that error appears in the above-identified patent and that said Letters Patent is hereby corrected as shown below:

IN THE SPECIFICATIONS:

Col. 5, line 32 should read: "unique distinguisher for generation of multiple link-LSA. The"

IN THE CLAIMS:

Col. 7, line 27 should read: "router to the first router that is the spoke router."

Signed and Sealed this  
Eighteenth Day of June, 2013

Teresa Stanek Rea  
*Acting Director of the United States Patent and Trademark Office*